United States Patent [19]

White

[11] Patent Number: 5,689,864
[45] Date of Patent: Nov. 25, 1997

[54] RIB CLAMP

[75] Inventor: James G. White, Bristol, R.I.

[73] Assignee: The United States of America as represented by the Secretary of the Navy, Washington, D.C.

[21] Appl. No.: 810,203

[22] Filed: Mar. 3, 1997

[51] Int. Cl.⁶ ................................................ A44B 21/00
[52] U.S. Cl. ...................... 24/514; 24/569; 24/459; 24/486; 24/327; 269/93; 269/94; 269/238; 269/152; 269/43
[58] Field of Search .................... 24/514, 569, 459, 24/486, 326, 327; 269/93, 94, 238, 152, 43

[56] References Cited

U.S. PATENT DOCUMENTS

| 1,428,679 | 9/1922 | Caswell | 269/238 |
| 1,640,883 | 8/1927 | Coleman | 269/238 |
| 2,174,254 | 9/1939 | Black | 24/486 X |
| 2,824,913 | 2/1958 | Taylor | 24/569 X |
| 3,807,718 | 4/1974 | Sendoykas | 269/94 X |

FOREIGN PATENT DOCUMENTS

| 219939 | 9/1910 | Germany | 269/238 |
| 2600258 | 7/1976 | Germany | 269/238 |
| 251418 | 1/1927 | Italy | 24/326 |

Primary Examiner—Peter R. Brown
Assistant Examiner—Hanh V. Tran
Attorney, Agent, or Firm—Michael J. McGowan; Robert W. Gauthier; Prithvi C. Lall

[57] ABSTRACT

A clamp secures objects against a structure adjacent to and on either side of a rib of the structure. First and second arms are pivotally coupled to one another at a pivot point. The arms define a pair of opposing jaws that engage the rib and a pair of levers extending away from the opposing jaws on either side of the rib. A threaded member cooperating with each lever is rotated towards the structure. An object is positioned between each threaded member and the structure. In this way, the threaded members press the objects securely against the structure as the opposing jaws grip the rib.

20 Claims, 2 Drawing Sheets

RIB CLAMP

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates generally to clamps, and more particularly to a clamp that attaches to a structure's rib while simultaneously securing one or more objects against the structure adjacent the rib.

(2) Description of the Prior Art

Many wall structures incorporate ribs to increase the strength thereof. When it is necessary to secure an object to such a wall structure, it is desirable to maintain the integrity of all ribs. Thus, any means of securing objects to a ribbed wall structure should not require any modifications, e.g., drill holes, cuts, etc., to any rib. In addition, if the object must be easily removed at a later time, the means of securing the object should not involve a bonding material, e.g., glue, epoxy, solder, etc.

SUMMARY OF THE INVENTION

Accordingly, it is an object of the present invention to provide an apparatus that secures an object to a ribbed wall structure without requiring any modification of the ribbed wall structure.

Another object of the present invention is to provide an apparatus that secures an object to a ribbed wall structure while also allowing the object to be easily removed.

Still another object of the present invention is to provide a clamp capable of clamping to the rib of a ribbed wall structure without requiring any modification of the rib.

Other objects and advantages of the present invention will become more obvious hereinafter in the specification and drawings.

In accordance with the present invention, a clamp is provided that secures objects against a structure adjacent to and on either side of a rib of the structure. First and second arms are pivotally coupled to one another at a pivot point to define a pair of opposing jaws for engaging the rib and a pair of levers extending away from the opposing jaws on either side of the rib. A plurality of threaded members are in threaded engagement with the levers. At least one threaded member cooperates with each lever such that, when rotated towards the structure with one of the objects positioned between the threaded member and the structure, presses the object securely against the structure as the opposing jaws grip the rib. The clamp can be also used to securely grip the rib even when no objects are being secured to the structure. The clamp can be easily modified to secure a plurality of objects on either side of the rib.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein.

DESCRIPTION OF THE PREFERRED EMBODIMENT

Figure 1A:
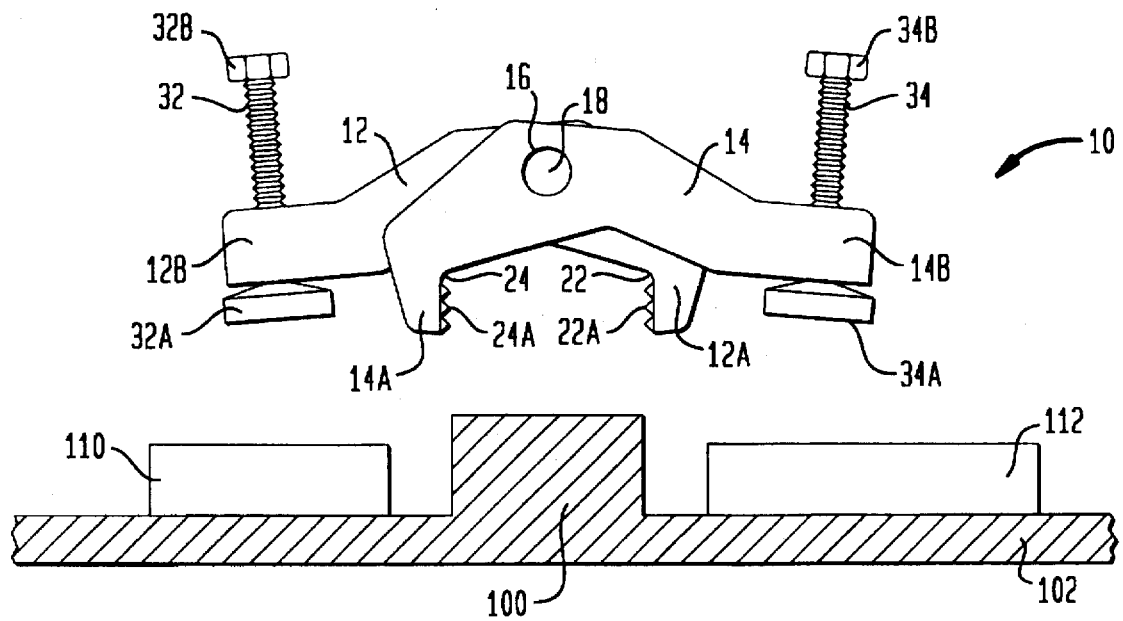
FIG. 1A is a side view of one embodiment of the rib clamp of the present invention prior to being clamped onto a rib of a structure on which objects positioned on either side of the rib are to be secured.
Figure 1B:
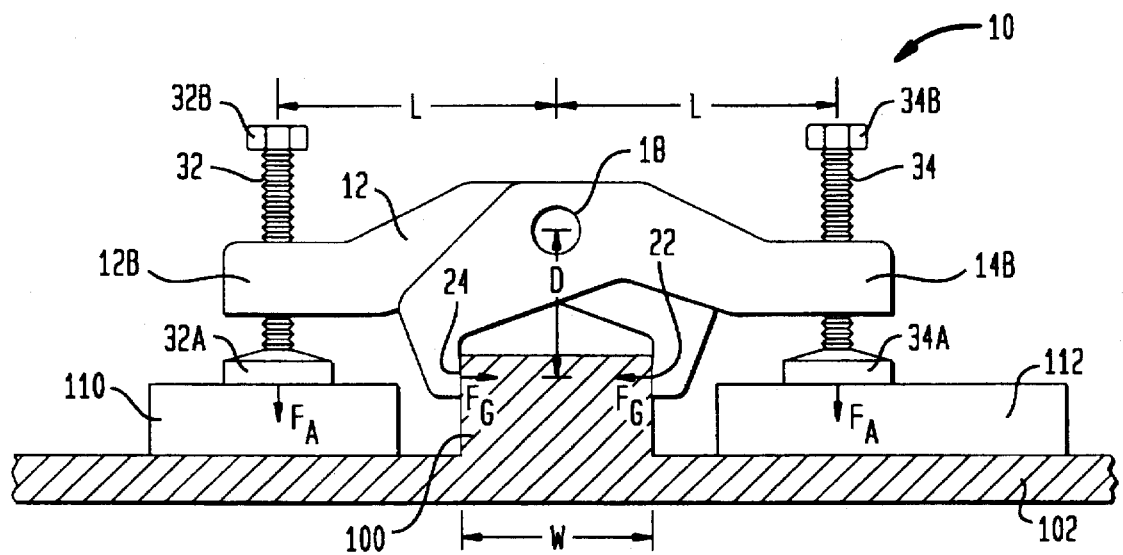
FIG. 1B is a side view of the rib clamp after it has engaged the rib and secured the objects to the structure.

Referring now to the drawings, and more particularly to FIGS. 1A and 1B, one embodiment of a rib clamp 10 according to the present invention is shown just prior to being clamped onto a rib 100 (FIG. 1A) and after being clamped onto rib 100 (FIG. 1B). By way of example, rib 100 is integral with a base (wall) structure 102, both of which are shown in cross section. In its preferred application, clamp 10 is used to easily secure objects 110 and 112 to base structure 102 without the use of any bonding adhesives. As illustrated, the two objects 110 and 112 are located on either side of rib 100. However, as will be apparent to one of ordinary skill in the art, clamp 10 can be used when only one object needs to be secured or when no objects need to be secured. In addition, as will be explained further below, clamp 10 can be modified to secure more than two objects to base structure 102.

Clamp 10 includes lever arms 12 and 14 pivotally coupled to one another by a pin 16 at a pivot point 18. Lever arms 12 and 14 are L-shaped at respective ends 12A and 14A to define opposing jaws that will be used to engage either side of rib 100. Each respective jaw face 22 and 24 can be provided with means to enhance the gripping action between each jaw face 22 and 24 and rib 100. For example, as shown, each jaw face 22 and 24 is formed with teeth 22A and 24A, respectively. Another option is to provide a non-skid material (e.g., rubber) on each jaw face 22 and 24. Still another option is to provide such a non-skid material on top of teeth 22A and 24A.

Lever arms 12 and 14 extend away from the opposing jaws (formed by ends 12A and 14A) on either side of rib 100. In the illustrated example, lever arm 12 extends (at least partially) over object 110 at end 12B while lever arm 14 extends (at least partially) over object 112 at end 14B. To secure clamp 10 to rib 100, and objects 110 and 112 to base structure 102, a jacking mechanism cooperates with each end 12B and 14B. By way of example, each jacking mechanism is a threaded screw 32 and 34 that is in threaded engagement with respective end 12B and 14B of lever arms 12 and 14. Each screw 32 and 34 can be provided with a base 32A and 34A to facilitate turning of the screws and to distribute pressure exerted by the screws when clamp 10 is secured to rib 100 as will now be explained. Also, screws 32 and 34 can be provided with hex sockets 32B and 34B to aid in the turning of the screws.

In operation, the opposing jaws formed by ends 12A and 14A are held in an open position and placed over rib 100 as shown in FIG. 1A. Objects 110 and 112 are positioned on base structure 102 on either side of rib 100 such that they are between respective screws 32 and 34 and base structure 102. Screws 32 and 34 are then rotated towards base structure 102 until they engage objects 110 and 112. Rotation of screws 32 and 34 continues until jaw faces 22 and 24 engage rib 100. At this point, screws 32 and 34 are further rotated until a required axial force, represented by the arrows designated $F_A$, is applied to respective objects 110 and 112. At the same time, lever arms 12 and 14 move such that the opposing jaws formed by ends 12A and 14A securely grip rib 100 with a gripping force, represented by the arrows designated $F_G$, applied through jaw faces 22 and 24. The use of bases 32A and 34A distribute the axial force $F_A$ applied to each of objects 110 and 112.

The compressive or gripping force $F_G$ applied at jaw faces 22 and 24 to rib 100 varies in proportion to the axial force $F_A$ exerted by screws 32 and 34 on objects 110 and 112. Typically, rib 100 is made of a rigid material. However, objects 110 and 112 may be delicate instruments (e.g., sensors). Accordingly, the gripping force $F_G$ applied to rib 100 can typically be greater than the axial force $F_A$ applied to objects 110 and 112. The ratio of $F_G$ to $F_A$ varies with the width W of rib 100 (and therefore the width of the opposing jaws formed by ends 12A and 14A), the distance D from pivot point 18 to a point that is centrally located in the area between jaw faces 22 and 24 subjected to gripping force $F_G$, and the distance L from each of screws 32 and 34 to pivot point 18.

In the illustrated embodiment, the opposing jaws formed by ends 12A and 14A are identically sized and shaped. In this way, pivot point 18 is centrally positioned over rib 100 as the compressive or gripping forces are applied thereto. This provides a stable clamp structure in which the compressive forces are balanced on either side of rib 100.

The advantages of the present invention are numerous. Neither a base structure nor its ribs need to be modified when used in conjunction with the subject rib clamp. The apparatus secures the clamp to the rib and also secures one or more objects to the base structure. Thus, securing (and removal) of the objects is accomplished simply and without the use of any bonding agents. This is especially important when the objects to be secured are sensors (e.g., thermal, acoustic, etc.) that require direct contact with the base structure. Also, the apparatus can be utilized as a lifting device with the clamp secured to the rib and the screws engaging the base structure directly.

Figure 2:
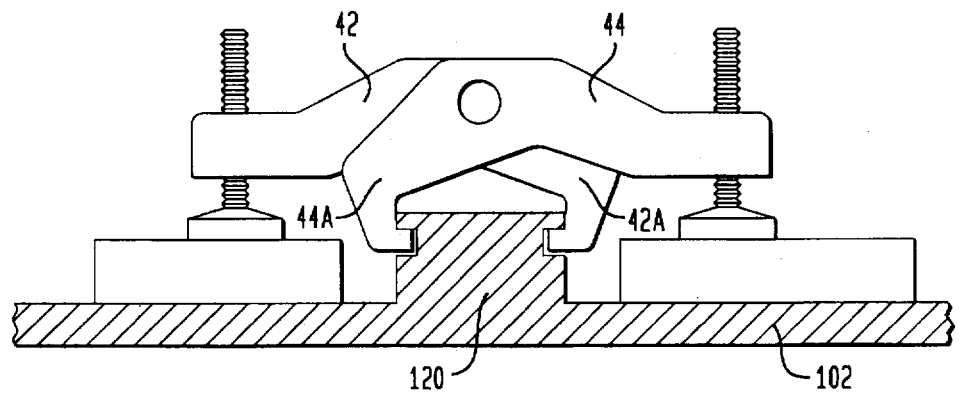
FIG. 2 is an alternative embodiment of the rib clamp with its jaws modified to cooperate with a rib that is shaped like an I-beam.

Although the present invention has been described relative to a specific embodiment thereof, it is not so limited. For example, as shown in FIG. 2, base structure 102 may have a rib 120 that is constructed in the shape of an I-beam. Lever arms 42 and 44 could then be C-shaped at respective ends 42A and 44A such that the opposing jaws formed thereby positively engaged the I-beam shaped construction of rib 120.

Figure 3:
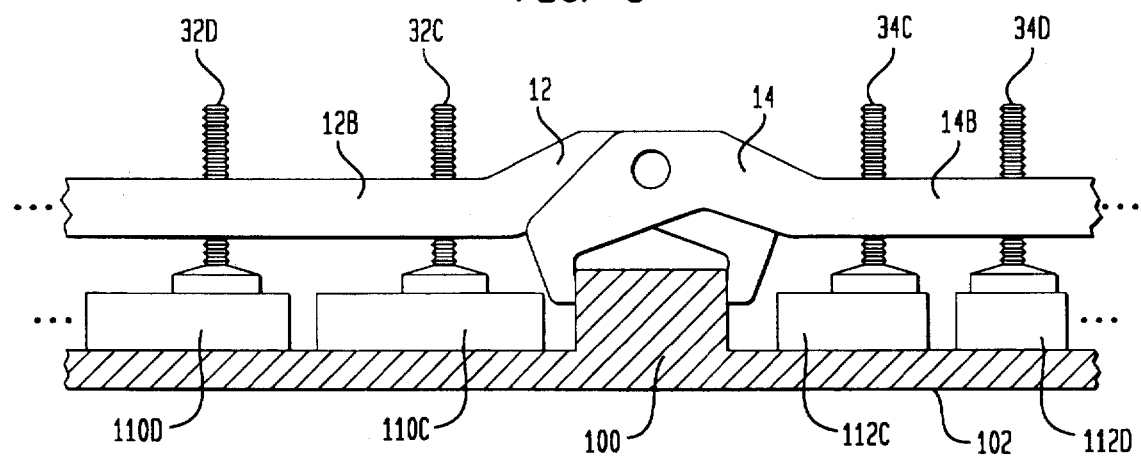
FIG. 3 is another alternative embodiment of the rib clamp in which a plurality of objects can be secured on either side of the rib.

As mentioned above, the rib clamp of the present invention can be modified to secure a plurality of objects on either side of the rib to which it is clamped. Such a modification is shown in FIG. 3 where a plurality of screws 32C, 32D, . . . and 34C, 34D, are positioned in successive fashion along, and threaded through, ends 12B and 14B. Screws 32C and 34C are used to generate the necessary gripping force on rib 100 while securing objects 110C and 112C. Remaining screws 32D and 34D, . . . can be used to secure corresponding objects 110D and 112D, . . . to base structure 102. Any screws not needed could be removed from ends 12B and 14B.

Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A clamp which secures an object against a structure adjacent a rib of said structure, said clamp comprising:

a first lever arm;

a second lever arm pivotally coupled to said first lever arm at a pivot point wherein a portion of said first lever arm extends beyond said pivot point to form a first jaw and a portion of said second lever arm extends beyond said pivot point to form a second jaw opposing said first jaw;

a first jack resting atop said object and coupled to said first lever arm wherein said pivot point is between said first jaw and said first jack, said first jack moving said first lever arm about said pivot point wherein said first jack applies pressure to said object to secure said object against said structure as said first jaw engages a first side of said rib; and a second jack resting atop said structure and coupled to said second lever arm wherein said pivot point is between said second jaw and said second jack, said second jack moving said second lever arm about said pivot point wherein said second jack applies pressure to said structure as said second jaw engages a second side of said rib opposite said first side of said rib.

2. A clamp as in claim 1 wherein a second object is positioned between said second jack and said structure wherein said second jack applies pressure to said second object to secure said second object against said structure as said second jaw engages said second side of said rib.

3. A clamp as in claim 1 wherein said first jaw and said second jaw are identically sized and shaped.

4. A clamp as in claim 1 wherein said first jaw and said second jaw are sized and shaped such that said pivot point is centrally positioned over said rib when said first jaw engages said first side of said rib and said second jaw engages said second side of said rib.

5. A clamp as in claim 1 wherein each of said first jaw and said second jaw comprises grip enhancement means where said first jaw and said second jaw contact said first side of said rib and said second side of said rib, respectively.

6. A clamp as in claim 1 wherein each of said first jack and said second jack comprises a threaded member in threaded engagement with said first lever arm and said second lever arm, respectively.

7. A clamp as in claim 6 wherein each said threaded member is terminated in a base for distributing said pressure when each said threaded member is rotated to cause said first jaw to engage said first side of said rib and said second jaw to engage said second side of said rib.

8. A clamp as in claim 1 wherein said rib is of I-beam shaped construction, and wherein each of said first jaw and said second jaw is shaped to positively engage said I-beam shaped construction of said rib.

9. A clamp which secures objects against a structure adjacent to and on either side of a rib of said structure, said clamp comprising:

first and second arms pivotally coupled to one another at a pivot point to define a pair of opposing jaws for engaging said rib and a pair of levers extending away from said opposing jaws on either side of said rib; and a plurality of threaded members in threaded engagement with said levers, wherein said plurality of threaded members includes at least one threaded member cooperating with each of said levers which, when rotated towards said structure with one of said objects positioned between said at least one threaded member and said structure, rotates said pair of levers about said pivot point and presses said one of said objects securely against said structure as said opposing jaws grip said rib.

10. A clamp as in claim 9 wherein said opposing jaws are identically sized and shaped.

11. A clamp as in claim 9 wherein said opposing jaws are sized and shaped such that said pivot point is centrally positioned over said rib when said opposing jaws engage said rib.

12. A clamp as in claim 9 wherein each of said opposing jaws includes grip enhancement means where said opposing jaws contact said rib.

13. A clamp as in claim 9 wherein each said at least one threaded member is terminated in a base that contacts said one of said objects when each said at least one threaded member is rotated towards said structure.

14. A clamp as in claim 9 wherein said rib is of I-beam shaped construction, and wherein said opposing jaws are shaped to positively engage said I-beam shaped construction of said rib.

15. A clamp which clamps to a rib of a structure, said clamp comprising:

first and second arms pivotally coupled to one another at a pivot point to define a pair of opposing jaws for engaging said rib and a pair of levers extending away from said opposing jaws on either side of said rib; and a plurality of threaded members in threaded engagement with said levers, wherein said plurality of threaded members includes at least one threaded member cooperating with each of said levers which, when rotated to contact said structure, rotates said pair of levers about said pivot point and presses against said structure as said opposing jaws grip said rib.

16. A clamp as in claim 15 wherein said opposing jaws are identically sized and shaped.

17. A clamp as in claim 15 wherein said opposing jaws are sized and shaped such that said pivot point is centrally positioned over said rib when said opposing jaws engage said rib.

18. A clamp as in claim 15 wherein each of said opposing jaws include grip enhancement means where said opposing jaws contact said rib.

19. A clamp as in claim 15 wherein each said at least one threaded member is terminated in a base that contacts said structure when each said at least one threaded member is rotated towards said structure.

20. A clamp as in claim 15 wherein said rib is of I-beam shaped construction, and wherein said opposing jaws are shaped to positively engage said I-beam shaped construction of said rib.

* * * * *